(12) United States Patent
Suzuki et al.

(10) Patent No.: US 11,221,536 B2
(45) Date of Patent: *Jan. 11, 2022

(54) ELECTROCHROMIC DEVICE

(71) Applicant: Panasonic Intellectual Property Management Co., Ltd., Osaka (JP)

(72) Inventors: Takashi Suzuki, Osaka (JP); Shotaro Ogawa, Osaka (JP); Makoto Morita, Hyogo (JP); Akira Shiokawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 159 days.

This patent is subject to a terminal disclaimer.

(21) Appl. No.: 16/139,781

(22) Filed: Sep. 24, 2018

(65) Prior Publication Data
US 2019/0025663 A1 Jan. 24, 2019

Related U.S. Application Data

(63) Continuation of application No. PCT/JP2016/004716, filed on Oct. 27, 2016.

(30) Foreign Application Priority Data

Mar. 28, 2016 (JP) .............................. JP2016-062991

(51) Int. Cl.
*G02F 1/163* (2006.01)
*G02F 1/1506* (2019.01)
(Continued)

(52) U.S. Cl.
CPC ............ *G02F 1/163* (2013.01); *G02F 1/1506* (2013.01); *G02F 1/1525* (2013.01); *G02F 1/155* (2013.01);
(Continued)

(58) Field of Classification Search
CPC ........ G02F 1/15; G02F 1/1506; G02F 1/1508; G02F 1/1514; G02F 1/1523;
(Continued)

(56) References Cited

U.S. PATENT DOCUMENTS 3,736,043 A * 5/1973 Sambucetti .............. C09K 9/02
359/228
4,878,743 A * 11/1989 Aikawa ................... B60R 1/088
359/271
(Continued)

FOREIGN PATENT DOCUMENTS

WO     2016/021190     2/2016

OTHER PUBLICATIONS

International Search Report (ISR) dated Jan. 17, 2017 in International (PCT) Application No. PCT/JP2016/004716.

*Primary Examiner* — Nicholas R. Pasko
(74) *Attorney, Agent, or Firm* — Wenderoth, Lind & Ponack, L.L.P.

(57) ABSTRACT

An electrochromic device includes: a first electrode which transmits light; a second electrode disposed opposite the first electrode; an electrolyte located between the first electrode and the second electrode, and containing metal depositable on one of the first electrode and the second electrode, according to a potential difference between the first electrode and the second electrode; a driver which applies a predetermined potential to a target electrode which is at least one of the first electrode and the second electrode; and a controller which changes a potential application portion of the target electrode to which the predetermined potential is applied, in a potential application period during which the predetermined potential is applied.

7 Claims, 8 Drawing Sheets

(51) Int. Cl.
*G02F 1/1523* (2019.01)
*G02F 1/155* (2006.01)

(52) U.S. Cl.
CPC .. *G02F 2001/1555* (2013.01); *G02F 2201/44* (2013.01)

(58) Field of Classification Search
CPC ...... G02F 1/1524; G02F 1/1525; G02F 1/155; G02F 1/163; G02F 2001/15145; G02F 2001/1552; G02F 2001/1555; G02F 2001/1557
USPC .................................................. 359/265–275
See application file for complete search history.

(56) References Cited

U.S. PATENT DOCUMENTS

| | | | | |
|---|---|---|---|---|
| 6,795,226 B2* | 9/2004 | Agrawal | ........... | B32B 17/10513 359/265 |
| 7,876,399 B2* | 1/2011 | Seelhammer | ..... | G02F 1/134309 349/69 |
| 7,907,323 B2* | 3/2011 | Shimotani | ............ | G02F 1/1506 359/270 |
| 8,159,483 B2* | 4/2012 | Ikeda | .................... | G02F 1/1506 345/204 |
| 8,405,896 B2* | 3/2013 | Lamine | .................. | G02F 1/155 359/265 |
| 8,643,932 B2* | 2/2014 | Ikeda | ....................... | G02F 1/17 359/267 |
| 2010/0091352 A1* | 4/2010 | Kokeguchi | ........... | G02F 1/1506 359/268 |
| 2011/0170030 A1* | 7/2011 | Boote | ...................... | E06B 9/24 349/41 |
| 2012/0307340 A1* | 12/2012 | Archambeau | .......... | G02F 1/155 359/275 |
| 2013/0271815 A1* | 10/2013 | Pradhan | ................. | G02F 1/155 359/275 |
| 2015/0043053 A1* | 2/2015 | Satoh | .................... | G02F 1/0316 359/290 |
| 2015/0362818 A1* | 12/2015 | Greer | ...................... | G02F 1/155 359/275 |
| 2016/0291437 A1 | 10/2016 | Ogawa et al. | | |
| 2017/0097553 A1* | 4/2017 | Jack | .................... | G02F 1/0121 |
| 2019/0018296 A1* | 1/2019 | Suzuki | .................... | G02F 1/155 |

* cited by examiner

ELECTROCHROMIC DEVICE

CROSS REFERENCE TO RELATED APPLICATIONS

This application is a U.S. continuation application of PCT International Patent Application Number PCT/JP2016/004716 filed on Oct. 27, 2016, claiming the benefit of priority of Japanese Patent Application Number 2016-062991 filed on Mar. 28, 2016, the entire contents of which are hereby incorporated by reference.

BACKGROUND

1. Technical Field

The present disclosure relates to an electrochromic device.

2. Description of the Related Art

Conventionally, electrochromic devices which can repeatedly switch between a transparent state and a reflective (light-shielding) state, by repeatedly depositing and dissolving metal have been disclosed as in WO 2016/021190.

SUMMARY

The present disclosure provides an electrochromic device which can more uniformly deposit metal on a surface.

An electrochromic device according to the present disclosure includes: a first electrode which transmits light; a second electrode disposed opposite the first electrode; an electrolyte located between the first electrode and the second electrode, and containing metal depositable on one of the first electrode and the second electrode, according to a potential difference between the first electrode and the second electrode; a driver which applies a predetermined potential to a target electrode which is at least one of the first electrode and the second electrode; and a controller which changes a potential application portion of the target electrode to which the predetermined potential is applied, in a potential application period during which the predetermined potential is applied.

The electrochromic device according to the present disclosure can deposit metal more uniformly on a surface.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Figure 1:
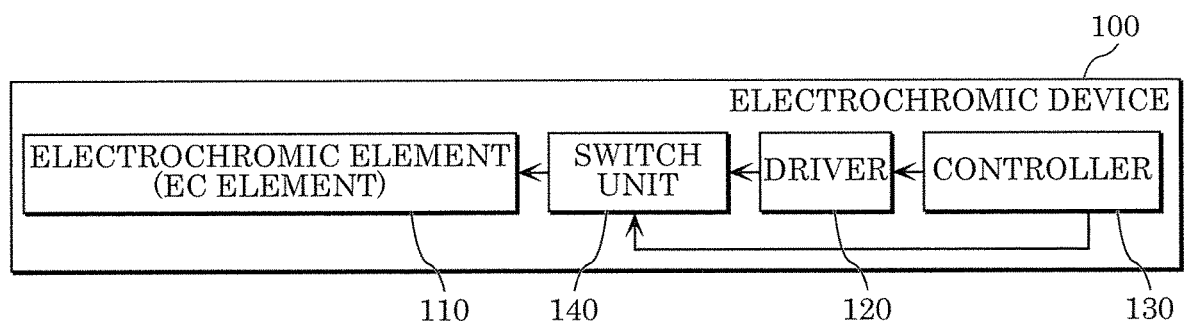
FIG. 1 is a block diagram illustrating an electrochromic device according to an embodiment.

The following describes embodiments in detail with reference to the drawings as appropriate. However, an excessively detailed description may be omitted. For example, a detailed description of a matter already known well and a redundant description of substantially the same configuration may be omitted. This is intended to avoid making the following description unnecessarily redundant and to facilitate understanding of persons skilled in the art.

Note that the inventors provide the accompanying drawings and the following description in order that a person skilled in the art sufficiently understands the present disclosure, and do not intend to limit the subject matter of the claims by the drawings and the description. Thus, the embodiments described below each show a specific example of the present disclosure. The numerical values, shapes, materials, elements, the arrangement and connection of the elements, and the like described in the following embodiments are examples, and thus are not intended to limit the present disclosure. Therefore, among the elements in the following embodiments, elements not recited in any of the independent claims are described as arbitrary elements.

Note that the diagrams are schematic diagrams, and do not necessarily provide strict illustration. Accordingly, for example, scales are not necessarily the same in the drawings. In addition, the same numeral is given to a substantially same configuration throughout the drawings, and a redundant description thereof may be omitted or simplified.

Embodiment

The following describes embodiments, with reference to the drawings.

[1. Configuration]

FIG. 1 is a block diagram illustrating electrochromic device 100 according to the present embodiment.

As illustrated in FIG. 1, electrochromic device (hereafter, referred to as EC device) 100 includes electrochromic element (hereafter, referred to as EC element) 110, driver 120 which drives EC element 110, and controller 130 which controls driver 120 and switch unit 140, and switch unit 140 which switches connection between EC element 110 and driver 120.

EC element 110 has an optical state which can change according to an applied electric field. Specifically, driver 120 applies an electric field to EC element 110, whereby the optical state of EC element 110 is changed. Examples of the optical state include a transparent state in which light (visible light) is allowed to pass through, and a light-shielding state in which light is shielded (not allowed to pass through). In the present embodiment, EC element 110 can achieve the transparent state, and a reflective state in which light is reflected as examples of the light-shielding state. The reflection in the reflective state is specular reflection, but may be scatter reflection.

Note that the examples of the optical state may include a scattering state in which light is scattered, and an absorbing state in which light is absorbed, for instance. The examples of the optical state may further include a color control state in which the wavelength (color) of light allowed to pass through or reflected is changed. EC device 100 according to the present embodiment switches the optical state of EC element 110 between the transparent state and the reflective state, for example, by controlling the electric field applied to EC element 110.

Figure 2:
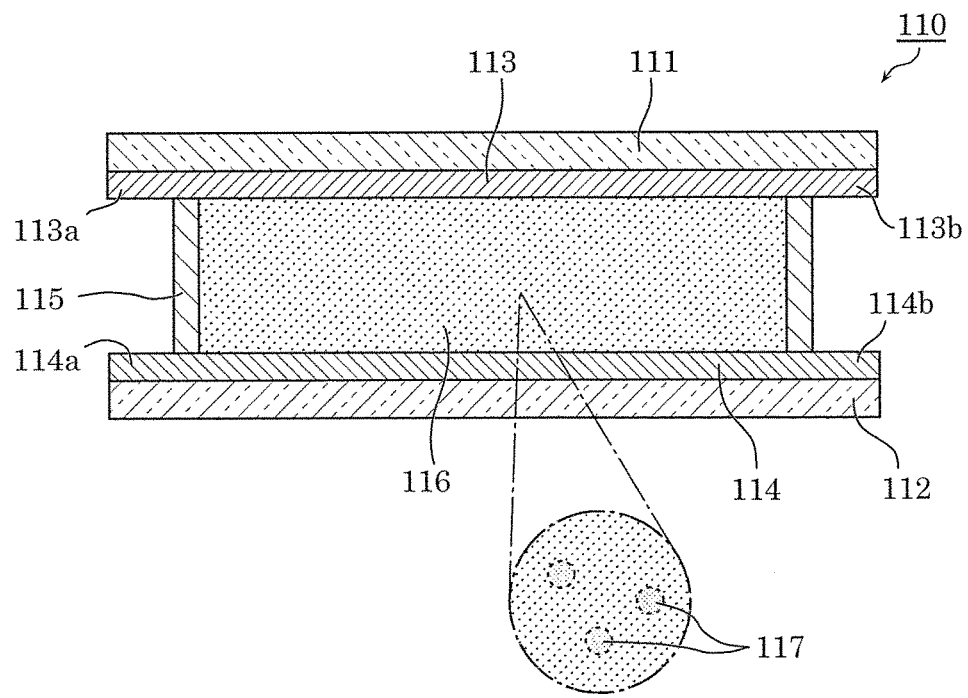
FIG. 2 is a cross-sectional view of an electrochromic element according to the embodiment.
Figure 3:
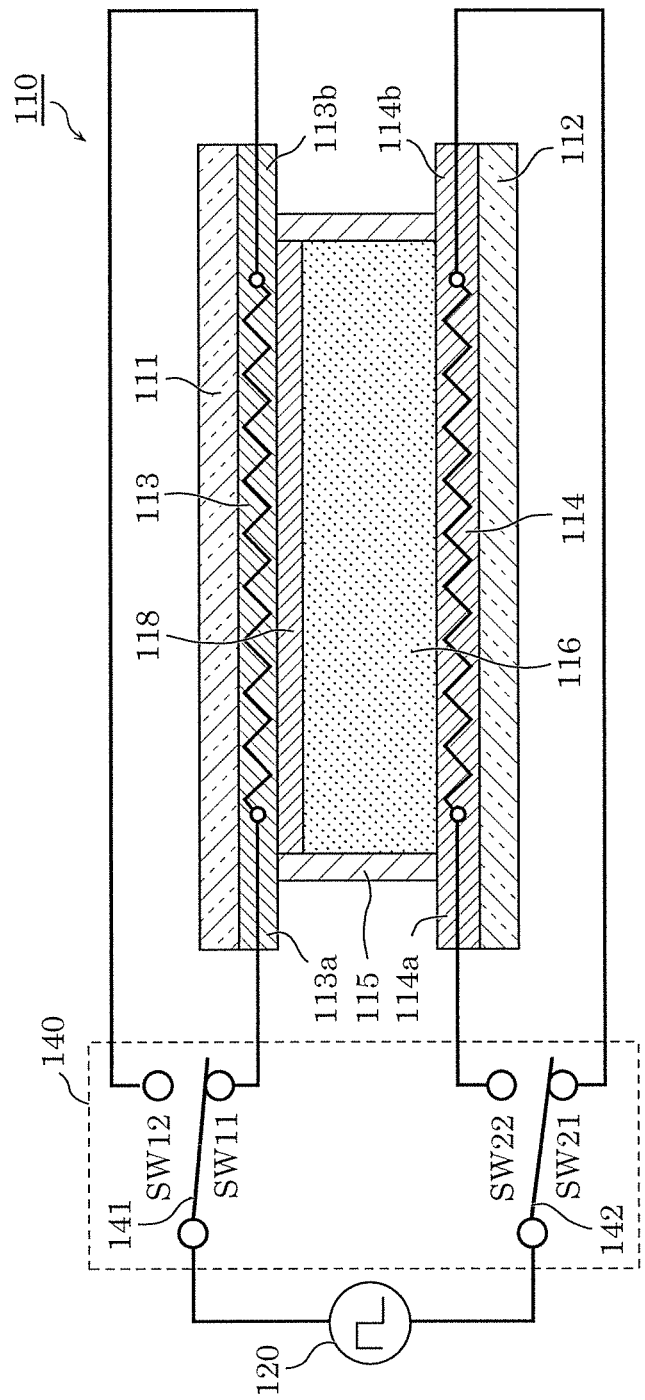
FIG. 3 is a cross-sectional view schematically illustrating a configuration of the electrochromic device according to the embodiment.

FIG. 2 is a cross-sectional view of EC element 110 according to the present embodiment. FIG. 3 is a cross-sectional view schematically illustrating a configuration of EC device 100 according to the present embodiment. Note that FIG. 3 schematically illustrates a relation of connection between EC element 110 and driver 120, and does not illustrate controller 130.

As illustrated in FIG. 2, EC element 110 includes first substrate 111, second substrate 112, first electrode 113, second electrode 114, spacer 115, and electrolyte 116. As schematically illustrated in FIG. 2, electrolyte 116 contains metal 117.

First electrode (transparent electrode) 113 is formed on a principal surface of first substrate 111 which faces second substrate 112. Second electrode (counter electrode) 114 is formed on a principal surface of second substrate 112 which faces first substrate 111. Specifically, first substrate 111 and second substrate 112 are disposed such that first electrode 113 and second electrode 114 face each other. In the present embodiment, the spacing between first electrode 113 and second electrode 114 is 0.2 mm, for example, but the present disclosure is not limited thereto, and the spacing may be changed as appropriate.

Spacer 115 is disposed between first electrode 113 and second electrode 114. Spacer 115 forms a flat plate-like space together with first electrode 113 and second electrode 114. The space is filled with electrolyte 116.

First substrate 111 and second substrate 112 are formed using insulating material such as glass or resin. First substrate 111 and second substrate 112 are light-transmitting boards, for example, and disposed opposite each other. The shapes of first substrate 111 and second substrate 112 in a plan view are, for example, quadrilateral, but the present disclosure is not limited thereto, and the shapes may each be a shape that includes a curve, such as a round shape.

First electrode 113 is a light-transmitting conducting film. First electrode 113 is a transparent electrode such as an indium tin oxide (ITO) electrode, for example. First electrode 113 is disposed on first substrate 111. First electrode 113 has a quadrilateral shape in a plan view, for example.

In the present embodiment, first electrode 113 is a target electrode to which driver 120 applies a potential. First electrode 113 includes terminal portions 113a and 113b.

Terminal portions 113a and 113b are located along the periphery of first electrode 113 in a plan view. Terminal portions 113a and 113b are portions to which driver 120 can apply a predetermined potential. Terminal portions 113a and 113b are located along the sides of the quadrilateral which is the shape of first electrode 113 in a plan view. Specifically, terminal portions 113a and 113b are located along the sides located diagonally to each other, or in other words, the sides opposite each other. In the present embodiment, as illustrated in FIG. 3, terminal portions 113a and 113b are each connected to driver 120 via switch 141.

Second electrode 114 is a counter electrode disposed opposite first electrode 113. In the present embodiment, second electrode 114 is a light-transmitting conducting film. Second electrode 114 is a transparent electrode such as an ITO electrode, for example. Second electrode 114 has a quadrilateral shape in a plan view, for example. In the present embodiment, first electrode 113 and second electrode 114 have the same size and the same shape, and are formed using the same material.

In the present embodiment, second electrode 114 is a target electrode to which driver 120 applies a potential. Accordingly, in the present embodiment, first electrode 113 and second electrode 114 are both target electrodes. Second electrode 114 includes terminal portions 114a and 114b.

Terminal portions 114a and 114b are located along the periphery of second electrode 114 in a plan view. Terminal portions 114a and 114b are portions to which driver 120 can apply a predetermined potential. Terminal portions 114a and 114b are located along the sides of the quadrilateral which is the shape of second electrode 114 in a plan view. Specifically, terminal portions 114a and 114b are located along the sides located diagonally to each other, or in other words, the sides opposite each other.

Terminal portions 114a and 114b face terminal portions 113a and 113b of first electrode 113, respectively. Specifically, in a plan view of EC element 110, terminal portions 113a and 114a overlap, and terminal portions 113b and 114b overlap. In the present embodiment, as illustrated in FIG. 3, terminal portions 114a and 114b are each connected to driver 120 via switch 142.

Spacer 115 is annularly disposed along the peripheries of first electrode 113 and second electrode 114 such that the terminal portions of first electrode 113 and second electrode 114 are located outside of spacer 115. Specifically, spacer 115 connects portions located on the inner side than the peripheries of first electrode 113 and second electrode 114 by a predetermined distance. Spacer 115 is formed by annularly applying a resin material such as a thermosetting resin, and hardening the applied resin material, for example.

Electrolyte 116 is a solution located between first electrode 113 and second electrode 114, and containing metal 117. Metal 117 is present in electrolyte 116 as metal ions. Electrolyte 116 is a solution which contains, as metal 117, silver ions which are to be deposited on first electrode 113, for example.

Note that electrolyte 116 may also contain other metal ions as metal 117, other than silver ions. Metal 117 can be deposited on first electrode 113 or second electrode 114, according to a potential difference applied between first electrode 113 and second electrode 114. Details will be later described.

Metal 117 is a noble metal, for example, and is specifically, silver, gold, platinum, or palladium, for instance, yet metal 117 is not limited thereto. Metal 117 may be copper. Metal such as a noble metal that has ionization tendency less than hydrogen is used as metal 117, so that metal 117 can be stably deposited as thin metal film 118 (see FIG. 3) when an electric field is applied.

Note that electrolyte 116 includes a solvent, for instance, in addition to an electrochromic material including metal 117.

Note that a user is assumed to look at EC element 110 from the first substrate 111 (first electrode 113) side in the present embodiment. Accordingly, for example, efficiency of charge exchange of first electrode 113 which is on the side a user looks at is made higher than efficiency of charge exchange of second electrode 114. Such a difference in efficiency of charge exchange between the electrodes is achieved by, for example, roughing the surface of second electrode 114 more than the surface of first electrode 113.

It is assumed that a user looks at EC element 110 from the first substrate 111 side. Accordingly, for example, second electrode 114 and second substrate 112 may be opaque. For example, second substrate 112 may be a silicon substrate, for instance, and second electrode 114 may be a metal electrode such as a copper electrode.

In addition, the material described in WO 2016/021190 may be used as it is, as the material of EC element 110, for instance.

Driver 120 applies a predetermined potential to both first electrode 113 and second electrode 114 of EC element 110. Thus, driver 120 is a power supply for applying a predetermined voltage between first electrode 113 and second electrode 114. As illustrated in FIG. 3, driver 120 is connected to first electrode 113 and second electrode 114 via lead wires and switch unit 140.

Driver 120 can change potentials to be applied to first electrode 113 and second electrode 114, based on the control by controller 130. For example, driver 120 controls, for instance, a timing at which a potential is applied and the magnitude of the potential, based on a control signal received from controller 130.

Driver 120 generates a pulsed undulating voltage (direct current voltage), based on, for example, power supplied from an external power supply such as a commercial power supply, and applies the voltage between first electrode 113 and second electrode 114. Note that driver 120 may apply an alternating current voltage.

Controller 130 is a microcomputer (microcontroller), for instance, which controls driver 120 and switch unit 140. Controller 130 is connected to driver 120 and switch unit 140 in a wired or wireless manner. Controller 130 transmits, to driver 120, a control signal for changing a timing at which an applied voltage (potential) is to be changed and the magnitude of the applied voltage. In addition, driver 120 transmits, to switch unit 140, a control signal for controlling change of potential application portions by switch unit 140.

In the present embodiment, controller 130 changes potential application portions of first electrode 113 and second electrode 114 to each of which a predetermined potential is applied, in a potential application period during which driver 120 applies the predetermined potential. Specifically, controller 130 repeatedly changes the potential application portions in the potential application period. A detailed operation is later described.

Switch unit 140 includes switches 141 and 142 as illustrated in FIG. 3.

Switch 141 connects driver 120 and first electrode 113. Specifically, switch 141 selectively connects driver 120 and terminal portions 113a and 113b of first electrode 113.

Switch 142 connects driver 120 and second electrode 114. Specifically, switch 142 selectively connects driver 120 and terminal portions 114a and 114b of second electrode 114.

Controller 130 controls switching of switches 141 and 142. Specifically, switches 141 and 142 operate in synchronization with each other. Operation of switches 141 and 142, for instance, is later described.

[2. Principle]

Figure 4:
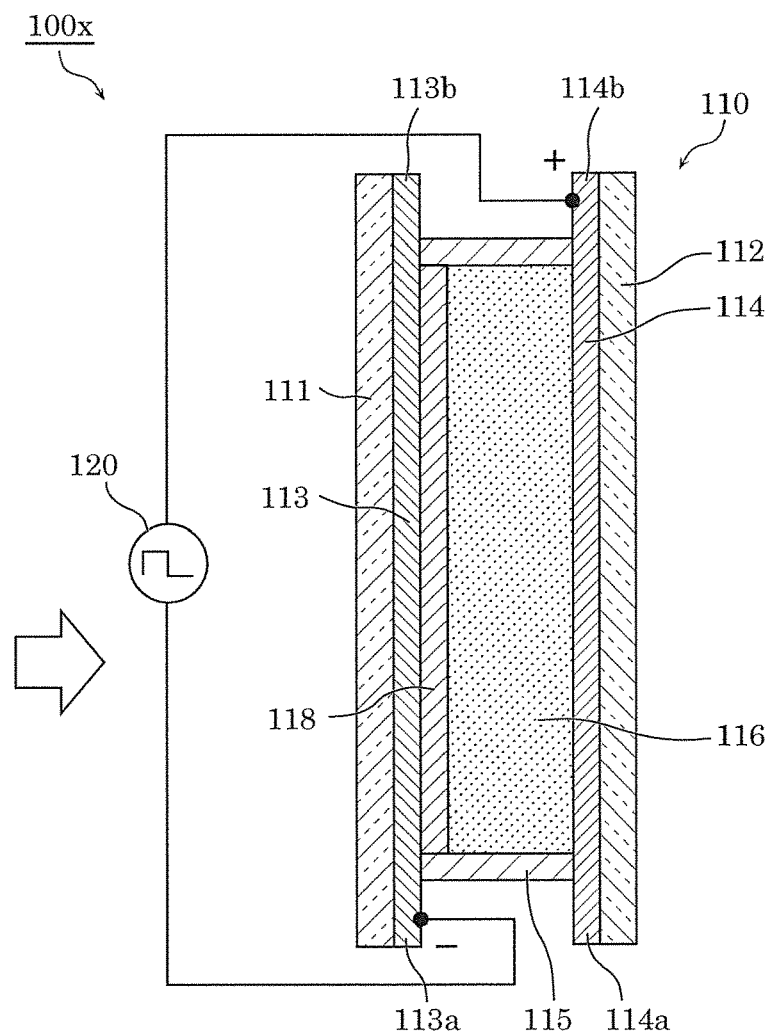
FIG. 4 is a diagram for illustrating a principle of the electrochromic element according to the embodiment.

Here, the principle of EC element 110 in the present embodiment is described with reference to FIG. 4. FIG. 4 is a diagram for illustrating the principle of EC element 110 in the present embodiment.

Here, the principle of EC element 110 is to be described, using conventional EC device 100x which does not include switch unit 140. In conventional EC device 100x, driver 120 is directly connected to first electrode 113 and second electrode 114 of EC element 110. EC element 110 has an optical state which changes according to an electric field applied from driver 120, and can maintain the changed optical state.

[2-1. Reflective State]

First, the operation for changing the optical state of EC element 110 from the transparent state to the reflective state is to be described.

Specifically, driver 120 applies, to EC element 110, an electric field from second electrode 114 to first electrode 113. Thus, driver 120 applies a predetermined potential to each of first electrode 113 and second electrode 114 so that first electrode 113 is a cathode (at low potential), and second electrode 114 is an anode (at high potential).

As a result, metal 117 (specifically, silver ions) in electrolyte 116 is deposited on the surface of first electrode 113, and thin metal film 118 is formed on the surface of first electrode 113, as illustrated in FIG. 4. Thin metal film 118 is obtained by metal 117 contained in electrolyte 116 being deposited into a film, and is a silver film, for example.

When a user looks at EC element 110 from the first substrate 111 side (in the outline arrow direction illustrated in FIG. 4), thin metal film 118 reflects light, so that EC element 110 functions as a mirror (in the reflective state). Note that when a material which does not reflect light is used as metal 117, thin metal film 118 functions as a light-shielding material (in the light-shielding state).

Note that in order to maintain the reflective state (or light-shielding state), driver 120 maintains an electric field applied to EC element 110 as it is when the transparent state is changed to the reflective state. For example, driver 120 applies a voltage so that first electrode 113 is a cathode and second electrode 114 is an anode.

[2-2. Transparent State]

The following describes an operation for changing the optical state of EC element 110 from the reflective state to the transparent state. Specifically, the state of EC element 110 is brought back to the original state (transparent state) in which thin metal film 118 is not included, by dissolving metal 117 (thin metal film 118) deposited on the surface of first electrode 113.

For example, driver 120 stops applying a voltage between first electrode 113 and second electrode 114, so as to bring EC element 110 into a floating state. In order to dissolve thin metal film 118 more quickly, an electric field having a polarity reverse to the direction in which metal 117 is deposited, that is, an electric field from first electrode 113 to second electrode 114 may be applied to EC element 110.

As described above, EC device 100 according to the present embodiment, can deposit metal 117 on and dissolve metal 117 from (form metal film 118 on and eliminate thin metal film 118 from) first electrode 113, according to a potential difference between first electrode 113 and second electrode 114, that is, an electric field applied to electrolyte 116.

[2-3. Problem Found by Inventors]

Figure 5:
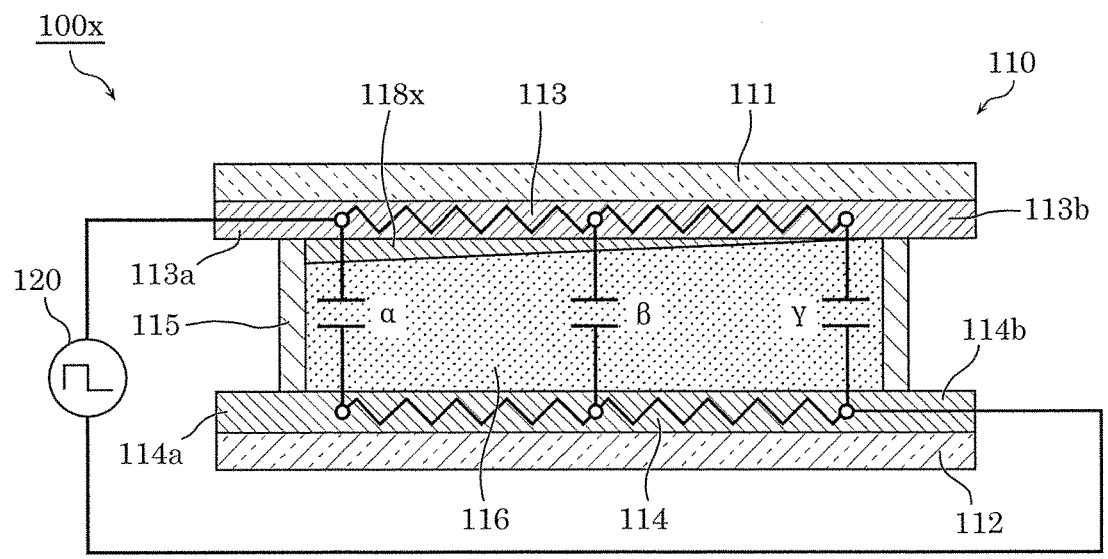
FIG. 5 is a schematic diagram for illustrating a problem of a conventional electrochromic device.
Figure 6:
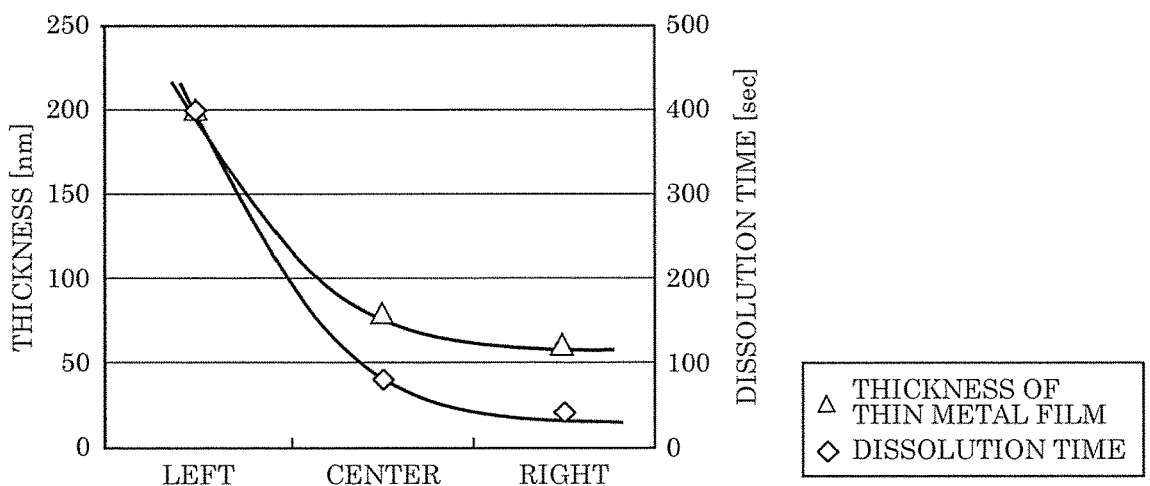
FIG. 6 is a correlation diagram illustrating a relation of a position on an electrode of the conventional electrochromic device with respect to the thickness of a thin metal film and a dissolution time.

The inventors found the following problems regarding conventional EC device 100x illustrated in FIG. 4. Here, the problems of EC device 100x illustrated in FIG. 4 are to be described with reference to FIGS. 5 and 6. FIG. 5 is a schematic diagram for illustrating problems of conventional EC device 100x. FIG. 6 is a correlation diagram illustrating a relation of the position on an electrode of conventional EC device 100x with respect to the thickness of thin metal film 118x and a dissolution time.

First electrode 113 and second electrode 114 face each other, and thus EC element 110 can be considered as a capacitor in which electrolyte 116 is used as a dielectric.

At this time, first electrode 113 on which metal 117 is deposited is a transparent electrode, and thus typically has a higher resistance than the resistance of a metal electrode, for instance. Accordingly, a voltage drops inside of first electrode 113, and the voltage differs at an edge portion (on the left) to which driver 120 is connected and an edge portion (on the right) opposite the edge portion.

For example, as illustrated in FIG. 5, EC element 110 can be divided into three regions, for convenience, namely a left region (closer to terminal portion 113a connected to driver 120), a center region, and a right region (closer to terminal portion 113b). In this case, the left, center, and right regions have different electrostatic capacitance, and accumulate electric charges $\alpha$, $\beta$, and $\gamma$, respectively. At this time, as mentioned above, due to the voltage drop, a potential difference between the electrodes is greater as closer to the left edge portion of EC element 110, and a potential difference between the electrodes is smaller as closer to the right edge portion. Thus, the electric charges satisfy the relation $\alpha > \beta > \gamma$.

Here, the amount of metal 117 deposited on the surface of first electrode 113 depends on the electric charges. Accordingly, as illustrated in FIG. 6, the thickness of thin metal film 118x varies depending on the position on the surface. In FIG. 6, the horizontal axis represents a position on the surface, and the vertical axes represent the thickness [nm] of thin metal film 118x and a dissolution time for thin metal film 118x to dissolve [sec].

Note that in FIG. 6, thin metal film 118x is a silver film, and the thickness is a value when a reflectance reaches 70% or more on the entire surface of first electrode 113 (a portion on which thin metal film 118x is formed). The dissolution time is a time for thin metal film 118x having a reflectance of 70% or more to dissolve and have a reflectance of 30% or less after the operation for dissolution starts.

Note that driver 120 applies a voltage of 1.6 V between first electrode 113 and second electrode 114 to form thin metal film 118x, and applies a voltage of 1 V having a reverse polarity between first electrode 113 and second electrode 114 to dissolve thin metal film 118x. The operation at this time is to form thin metal film 118, and thereafter dissolve thin metal film 118x after maintaining, for 30 sec, the state in which thin metal film 118x is formed. The details are as described in WO 2016/021190, for example.

As illustrated in FIG. 6, the thickness of thin metal film 118x is very thick at the left portion, or more specifically, is approximately three times as thick as the right portion. Accordingly, the left portion takes approximately 10 sec to have a reflectance of 70% or more when thin metal film 118x is formed, whereas the right portion takes approximately 25 sec. Accordingly, the time for the right portion of thin metal film 118x to have a reflectance of 70% or more is more than two times longer than the time for the left portion. To dissolve thin metal film 118x, the left portion takes approximately 400 sec, whereas the right portion takes approximately 40 sec, thus the time for the left portion is approximately ten times the time for the right portion.

Accordingly, when considering EC element 110 as a whole, it takes approximately 25 sec to form thin metal film 118x due to the influence of the right portion, and it takes approximately 400 sec to dissolve thin metal film 118x due to the influence of the left portion. Thus, the operation efficiency of EC element 110 falls due to the differences between the right and left portions.

[2-4. Specific Features of Present Disclosure]

The present embodiment is intended to improve the entire operation efficiency by reducing differences in the deposition time and the dissolution time between the right and left portions. A specific configuration is as illustrated in FIG. 3. Accordingly, as illustrated in FIG. 3, EC device 100 according to the present embodiment differs from EC device 100x illustrated in FIG. 5 in that switch unit 140 is included. Specifically, switch 141 is disposed between driver 120 and first electrode 113, and switch 142 is disposed between driver 120 and second electrode 114. Controller 130 changes (switches) a potential application portion to which a potential is applied by driver 120, by controlling switches 141 and 142.

Switch 141 is disposed in order to change a potential application portion of first electrode 113. Switch 141 is selectively connected to one of terminals SW11 and SW12, as illustrated in FIG. 3.

When switch 141 is connected to terminal SW11, driver 120 is connected to terminal portion 113a of first electrode 113 on the left. Accordingly, driver 120 can apply a potential to terminal portion 113a. When switch 141 is connected to terminal SW12, driver 120 is connected to terminal portion 113b of first electrode 113 on the right. Accordingly, driver 120 can apply a potential to terminal portion 113b.

Switch 142 is disposed in order to change a potential application portion of second electrode 114. Switch 142 is selectively connected to one of terminals SW21 and SW22, as illustrated in FIG. 3.

When switch 142 is connected to terminal SW21, driver 120 is connected to terminal portion 114b of second electrode 114 on the right. Accordingly, driver 120 can apply a potential to terminal portion 114b. When switch 142 is connected to terminal SW22, driver 120 is connected to terminal portion 114a of second electrode 114 on the left. Accordingly, driver 120 can apply a potential to terminal portion 114a.

At this time, controller 130 changes the potential application portions to the potential application portion of first electrode 113 and the potential application portion of second electrode 114 which form a combination of terminal portions most distant from each other in a plan view. In the example illustrated in FIG. 3, terminal portion 113a of first electrode 113 and terminal portion 114b of second electrode 114 form a combination of most distant terminal portions. In addition, terminal portion 113b of first electrode 113 and terminal portion 114a of second electrode 114 form another combination of most distant terminal portions.

Accordingly, for example, controller 130 makes switching to connect switches 141 and 142 to destinations, using a combination of terminals SW11 and SW21 or a combination of terminals SW12 and SW22. For example, in the case of the combination of terminals SW11 and SW21, a potential is applied to terminal portion 113a of first electrode 113 on the left or terminal portion 114b of second electrode 114 on the right. Accordingly, when a metal is to be deposited (when a metal is to be dissolved), a potential can be applied so that an electric field may extend diagonally of EC element 110.

Figure 7:
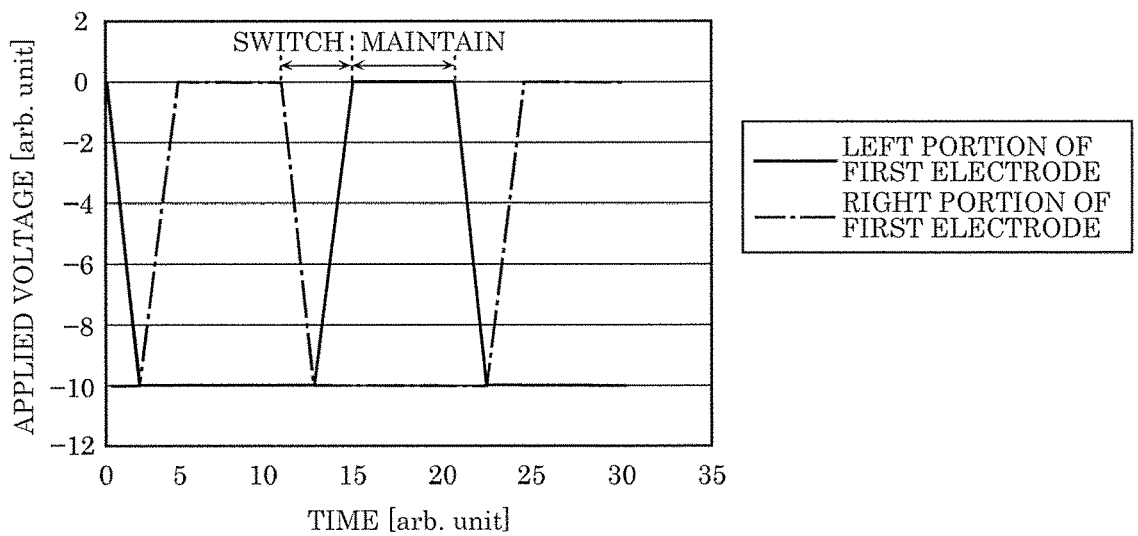
FIG. 7 illustrates a change in an applied voltage in the electrochromic device according to the embodiment.

FIG. 7 is a diagram illustrating a change in voltage applied to EC device 100 according to the present embodiment. FIG. 7 illustrates a change in voltage applied to first electrode 113, and an example of a pattern of the applied voltage. In FIG. 7, the horizontal axis represents time and the vertical axis represents an applied voltage.

Here, the value of an applied voltage "−10" is a voltage to be applied to deposit (dissolve) metal 117. At this time, switch 142 operates in conjunction with switch 141, yet the voltage applied to second electrode 114 is maintained at 0 V, without being changed with time.

In the present embodiment, for example, the connection destination of switch 141 is switched from terminal SW11 to terminal SW12 while applying a voltage between the right and left portions of first electrode 113 for a period in a range from 0.1 msec to 10 msec (the switching period in FIG. 7), for example, as illustrated in FIG. 7. Accordingly, the potential application portion of first electrode 113 is switched from terminal portion 113a to terminal portion 113b. Then, the state is maintained for a period of about several sec (the maintained period in FIG. 7). For example, the connection destination of switch 141 is switched from terminal SW12 to terminal SW11 while applying a voltage between the right and left portions of first electrode 113 in a period from 0.1 msec to 10 msec.

Thus, in a potential application period during which a predetermined potential (voltage) is applied, controller 130 changes the potential application portion from terminal portion 113a (a first terminal portion) to which a potential is being applied to terminal portion 113b (a second terminal portion) different from terminal portion 113a. Furthermore, controller 130 changes the potential application portion from terminal portion 113b to terminal portion 113a, in the potential application period. In the potential application period, controller 130 repeatedly changes the potential application portion. In the example illustrated in FIG. 7, first electrode 113 has only two terminal portions (terminal portions 113a and 113b), and thus controller 130 changes the potential application portion alternately between terminal portions 113a and 113b.

Note that the potential application period is a continuous period for depositing metal 117 or a continuous period for dissolving deposited thin metal film 118. The potential application period is a period (a deposition period or a dissolution period) when metal is either deposited or dissolved. Accordingly, driver 120 does not change the polarity of a predetermined potential (voltage) in the potential application period.

Note that in the example illustrated in FIG. 7, the voltage of "−10" is always applied to one of terminal portions 113a and 113b so that thin metal film 118 can be formed more quickly, yet the voltage of "−10" does not need to be applied to one of terminal portions 113a and 113b during the switching period. Furthermore, a current may be interrupted by switching.

Here, a voltage is applied while the potential at second electrode 114 is fixed to 0 V, yet if first electrode 113 and second electrode 114 have a potential difference which allows metal 117 to be deposited, the potential at second electrode 114 may be changed or alternatively, the potentials at both the electrodes may be changed.

Note that in the example illustrated in FIG. 7, the inclination of a change in the applied voltage during the switching period is linear, yet the present disclosure is not limited thereto. For example, the inclination of the change may show a sine curve or alternatively, an arbitrary curve. In addition, the waveform of the applied voltage illustrated in FIG. 7 may be rectangular.

Figure 8:
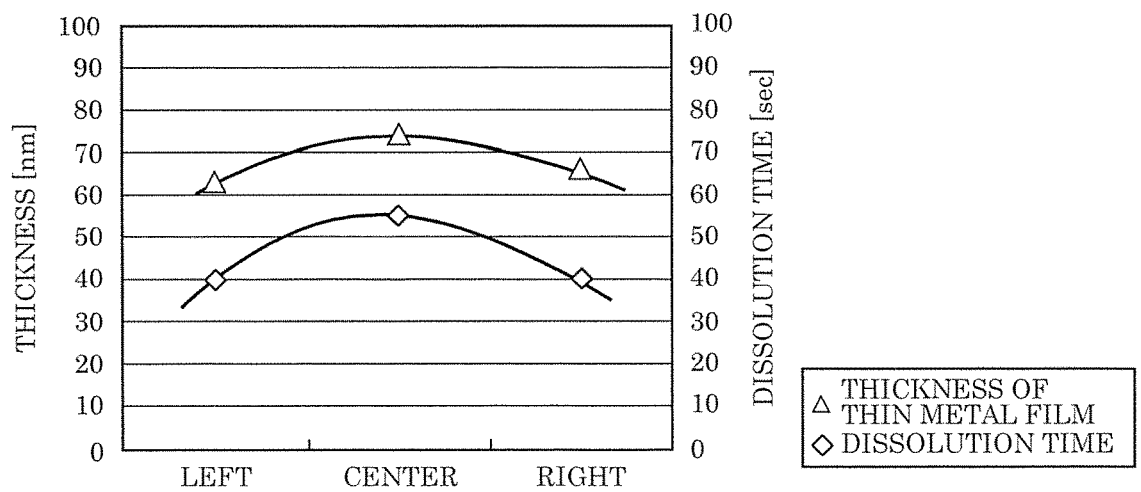
FIG. 8 is a correlation diagram illustrating a relation of a position on an electrode of the electrochromic device according to the embodiment with respect to the thickness of a thin metal film and a dissolution time.

The thickness of thin metal film 118 and the dissolution time for thin metal film 118 to dissolve when EC device 100 operates as above are described with reference to FIG. 8. FIG. 8 is a correlation diagram illustrating a relation of the position on the electrode of EC device 100 according to the present embodiment with respect to the thickness of thin metal film 118 and a dissolution time. Note that the measurement condition is the same as in the case of FIG. 6.

As illustrated in FIG. 8, the thickness is slightly thick in a center portion, yet a difference between the left portion and the right portion is approximately 10 nm. In this manner, the difference in the thickness between the right, center, and left portions of thin metal film 118 is small, so that thin metal film 118 having a more uniform thickness can be formed. Although not illustrated, the time (deposition time) for forming thin metal film 118 is approximately 15 sec, and thus is shorter than the case illustrated in FIG. 6.

In addition, the dissolution times for the left portion and the right portion are approximately 40 sec, and thus are substantially the same. Furthermore, the dissolution time for the center portion to dissolve is approximately 55 sec, and thus the dissolution time for the entirety of thin metal film 118 to dissolve is approximately 55 sec. Accordingly, the dissolution time significantly decreases, as compared with the case illustrated in FIG. 6.

As described above, according to the present embodiment, switches 141 and 142 are included, and the potential application portion of the electrode is changed, whereby thin metal film 118 can be formed to have a substantially uniform thickness. Furthermore, metal 117 can be deposited and dissolved efficiently. Specifically, time periods for depositing metal 117 and dissolving thin metal film 118 are shortened, and thus the optical states can be switched smoothly.

[3. Variation]

As mentioned above, the present embodiment has described an example in which first electrode 113 and second electrode 114 each have two terminal portions, yet the number of terminal portions is not limited thereto. The present embodiment has also described an example in which first electrode 113 and second electrode 114 have a quadrilateral shape in a plan view, yet the shape in a plan view may be round or oval, for instance.

The following describes Variations 1 and 2 of the present embodiment.

[3-1. Variation 1 (the Number of Terminal Portions)]

Figure 9:
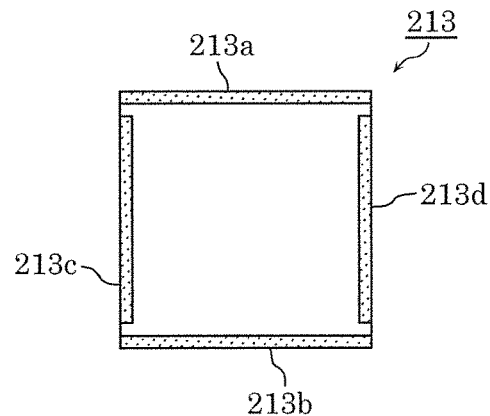
FIG. 9 is a plan view of a first electrode in Variation 1 of the embodiment.

FIG. 9 is a plan view of first electrode 213 in Variation 1.

The EC device (or EC element) according to this variation includes first electrode 213 and second electrode 214, instead of first electrode 113 and second electrode 114. First electrode 213 and second electrode 214 have the same configurations as those of first electrode 113 and second electrode 114, respectively, in the embodiment, except for the different number of terminal portions.

In this variation, first electrode 213 and second electrode 214 (see FIG. 10) have the same configuration. Accordingly, in the following, first electrode 213 is described as an example, and a description of a detailed configuration of second electrode 214 is omitted. In this variation, first electrode 213 has three or more potential application portions, and the potential application portion is sequentially changed from one of the three or more potential application portions to another.

Specifically, as illustrated in FIG. 9, first electrode 213 has four terminal portions 213a to 213d. First electrode 213 includes four terminal portions 213a to 213d along the periphery in a plan view. Specifically, first electrode 213 has, for example, a square shape in a plan view, and four terminal portions 213a to 213d are located along one for each of the sides of the square.

In this variation, a switch not illustrated (and corresponding to switch 141 in FIG. 3) selectively connects driver 120 with four terminal portions 213a to 213d. Controller 130 connects driver 120 with one of four terminal portions 213a to 213d by controlling the switch, so that a potential (voltage) is applied to the connected terminal portion.

Figure 10:
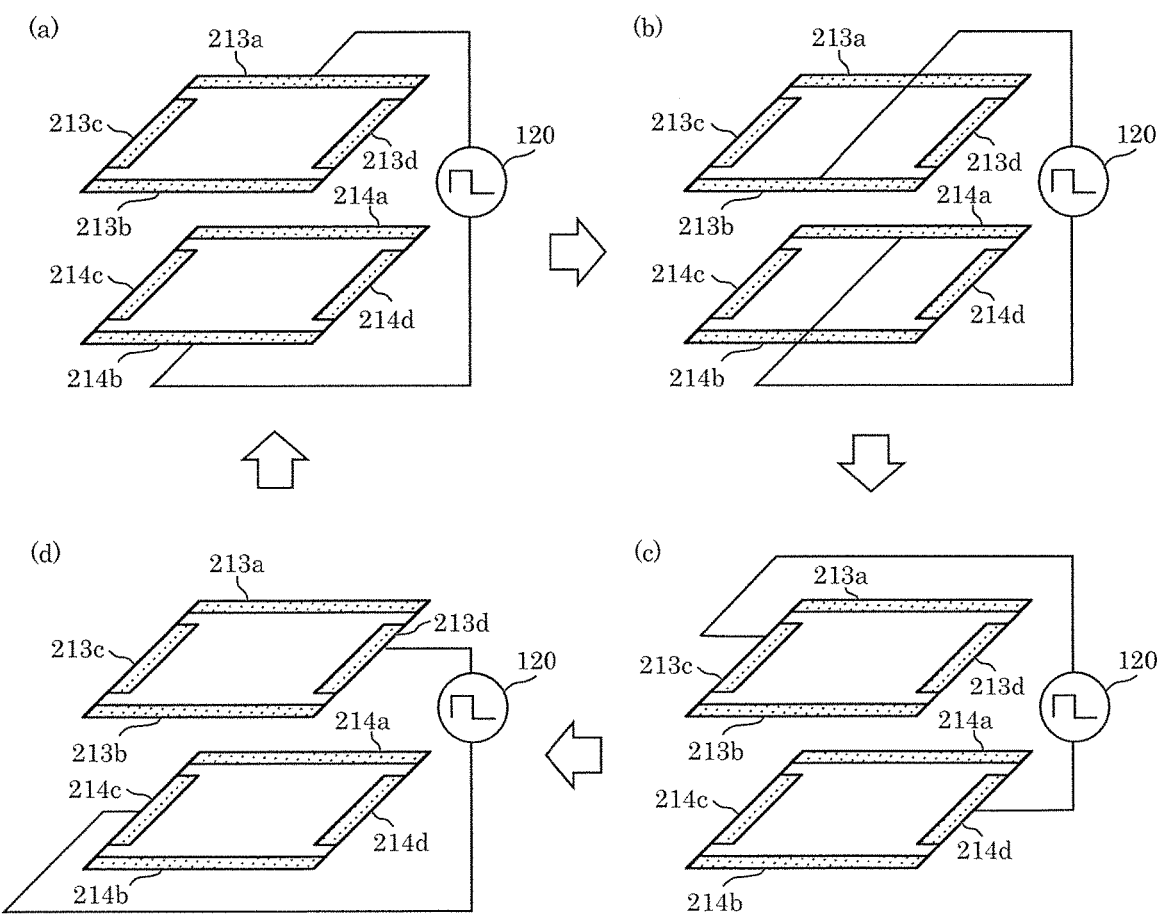
FIG. 10 is a transition diagram illustrating a temporal change of potential application portions of electrodes to which a voltage is applied in Variation 1 of the embodiment.

FIG. 10 is a transition diagram illustrating a temporal change of the potential application portions of the electrodes in this variation. Note that FIG. 10 schematically illustrates only first electrode 213 and second electrode 214 in this variation, and does not illustrate other elements such as first substrate 111.

Second electrode 214 has the same configuration as that of first electrode 213, and includes four terminal portions 214a to 214d. Four terminal portions 214a to 214d overlap terminal portions 213a to 213d of first electrode 213 in a plan view.

In this variation, controller 130 changes the potential application portion from a first terminal portion to which a potential is being applied to a second terminal portion most distant from the first terminal portion, in a potential applied period during which a potential is applied by driver 120. Controller 130 changes potential application portions to the potential application portion of first electrode 213 and the potential application portion of second electrode 214 which form a combination of terminal portions most distant from each other in a plan view.

At this time, such combinations of the terminal portion of first electrode 213 and the terminal portion of second electrode 214 are as follows, as illustrated in (a) to (d) of FIG. 10.

(a) Terminal portion 213a of first electrode 213 and terminal portion 214b of second electrode 214

(b) Terminal portion 213b of first electrode 213 and terminal portion 214a of second electrode 214

(c) Terminal portion 213c of first electrode 213 and terminal portion 214d of second electrode 214

(d) Terminal portion 213d of first electrode 213 and terminal portion 214c of second electrode 214

Thus, the terminal portions located diagonally from each other are combined. Specifically, a combination of terminal portions is determined such that an imaginary straight line from the potential application portion of first electrode 213 to the potential application portion of second electrode 214 extends horizontally (vertically) in electrolyte 116 in a plan view.

In this variation, controller 130 sequentially applies a voltage to four combinations illustrated in (a) to (d) of FIG. 10 for one time each, and repeats the sequential application of a voltage to the combinations in a potential application period during which a potential is applied. At this time, for example, the same potential difference is applied to each combination of terminal portions for the same period. For example, in one cycle of the sequential application of a voltage, controller 130 selects, from among terminal portions included in combinations to which a voltage is not yet applied, a terminal portion (the second terminal portion) most distant from a terminal portion to which a potential is being applied, and changes the potential application portion to the selected second terminal portion.

For example, as illustrated in (a) of FIG. 10, if the potential application portion of first electrode 213 is terminal portion 213a, a terminal portion most distant from terminal portion 213a is terminal portion 213b that is located along the side located opposite terminal portion 213a. Accordingly, controller 130 changes the potential application portions to terminal portions 213b and 214a, as illustrated in the change from (a) to (b) of FIG. 10.

Next, since the current potential application portion is terminal portion 213b, and a voltage has been applied to combinations (a) and (b), controller 130 selects a terminal portion most distant from terminal portion 213b, from among terminal portions 213c and 213d included in combinations to which a voltage is not yet applied, and changes the potential application portion to the selected terminal portion. Here, the distance between terminal portion 213c and terminal portion 213b and the distance between terminal portion 213d and terminal portion 213b are substantially the same, and thus controller 130 may select either of terminal portions 213c and 213d. For example, as illustrated in (c) of FIG. 10, controller 130 changes the potential application portion to terminal portion 213c and then to terminal portion 214d.

Next, among four combinations (a) to (d), controller 130 changes the potential application portion to combination (d) to which a voltage is not yet applied. Specifically, as illustrated in (d) of FIG. 10, controller 130 changes the potential application portions to terminal portions 213d and 214c.

After that, controller 130 repeats the sequential application of a voltage to combinations (a) to (d) in the potential application period. Accordingly, an electric field applied to electrolyte 116 is time-averaged, and equalized over a plane. This improves uniformity of the two-dimensional thickness of thin metal film 118.

Note that rather than sequentially applying a voltage to combinations (a) to (d) above, a voltage may be applied to (a) and (c) simultaneously, a voltage may be applied to (b) and (d) simultaneously, and such simultaneous application of a voltage may be repeated alternately for the two sets of the combinations.

In the example illustrated in FIGS. 9 and 10, first electrode 213 and second electrode 214 each include terminal portions one for each of the sides thereof, yet a terminal portion may be formed along two sides. Accordingly, a terminal portion may be formed into an L shape.

Figure 11:
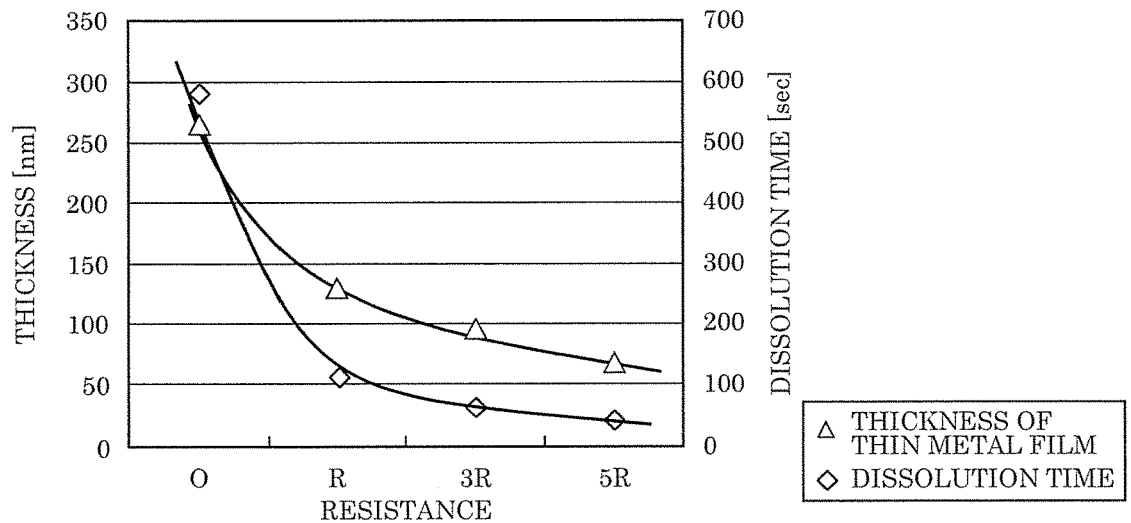
FIG. 11 is a correlation diagram illustrating a relation of a resistance between adjacent terminal portions based on a distance between electrodes of the electrochromic device according to Variation 1 of the embodiment with respect to the thickness of a thin metal film and a dissolution time.

Here, the spacing between adjacent terminal portions is to be described with reference to FIG. 11. FIG. 11 is a correlation diagram illustrating a relation of a resistance based on the distance between electrodes of the EC device according to this variation with respect to the thickness of a thin metal film and a dissolution time.

In FIG. 11, the horizontal axis represents a resistance between adjacent terminal portions, and the vertical axes represent the thickness [nm] and the dissolution time [sec]. The resistance represented by the horizontal axis in FIG. 11 is indicated by a numerical value obtained when "R" is a resistance between first electrode 213 and second electrode 214 via electrolyte 116. The resistance between adjacent terminal portions is, for example, a resistance in the shortest spacing between terminal portion 213a and terminal portion 213c. When adjacent terminal portions are very close to each other, the resistance is substantially 0, and is 0 in FIG. 11.

If adjacent terminal portions are completely isolated from each other and different potentials are applied thereto, the spacing between the terminal portions is not to be considered. However, if electrodes temporarily have the same voltage when changing an electrode to another, metal 117 is unintentionally deposited, and thus the spacing between adjacent terminal portions is to be taken into consideration.

As can be seen from FIG. 11, if resistance between adjacent terminal portions is low, thin metal film 118 is thick, or in other words, the amount of deposited metal 117 increases. Accordingly, the resistance between adjacent terminal portions is set to a resistance greater than or equal to resistance "R" between first electrode 213 and second electrode 214. Accordingly, the amount of deposited metal 117 can be made low, and the thickness of thin metal film 118 can be made uniform on the surface. For example, the resistance between adjacent terminal portions may be five times or more of "R". Accordingly, the thickness of thin metal film 118 can be made more uniform.

[3-2. Variation 2 (Shape of Electrode)]

Figure 12:
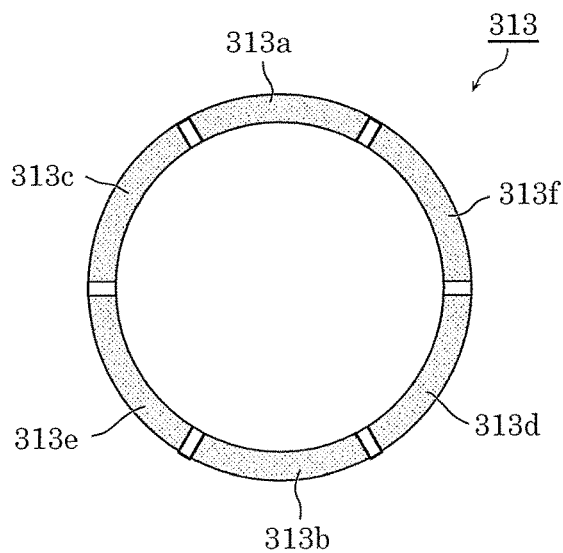
FIG. 12 is a plan view of a first electrode in Variation 2 of the embodiment.

FIG. 12 is a plan view of first electrode 313 in Variation 2.

The EC device (or EC element) according to this variation includes first electrode 313 illustrated in FIG. 12, instead of first electrode 113. First electrode 313 has the same configuration as that of first electrode 113 in the embodiment, except for differences in the shape in a plan view and the number of terminal portions. Note that although a detailed description is omitted, the EC device according to this variation includes a second electrode having the same configuration as that of first electrode 313, instead of second electrode 114.

As illustrated in FIG. 12, first electrode 313 has a round shape in a plan view. In this variation, first electrode 313 includes six terminal portions 313a to 313f. Six terminal portions 313a to 313f are located along plural arcs of the round shape. Driver 120 can be connected with six terminal portions 313a to 313f, and apply a potential thereto.

In this case, controller 130 changes the potential application portion from a first terminal portion to which a potential is being applied to a second terminal portion most distant from the first terminal portion, similarly to Variation 1, in a potential application period during which a potential is applied by driver 120. In this variation, first electrode 313 includes six terminal portions 313a to 313f along the circular arcs, and thus the second terminal portion is located along the arc located opposite the first terminal portion.

Controller 130 sequentially applies a potential to terminal portions 313a to 313f, once for each of the terminal portions. Controller 130 repeats such sequential application of a potential. Note that in one cycle of sequential application of a potential, controller 130 selects, from among plural terminal portions except for the terminal portion(s) to which a potential is already applied, a terminal portion most distant from the terminal portion to which a potential is being applied, as a subsequent potential application portion, and applies a potential to the selected terminal portion.

For example, controller 130 sequentially applies a potential to terminal portions 313a, 313b, 313c, 313d, 313e, and 313f in the stated order, and repeats the sequential application of a potential. Note that although controller 130 selects terminal portion 313c as a potential application portion subsequent to terminal portion 313b, controller 130 may select terminal portion 313f. In this case, controller 130 may sequentially apply a potential to terminal portions 313a, 313b, 313f, 313e, 313d, and 313c in the stated order, and repeat the potential application in the order.

Note that in this variation, the order of switching between terminal portions 313a to 313f is not limited to the example above. For example, terminal portions 313a to 313f may be switched along the circumference.

The number of terminal portions may be arbitrarily set to a numerical value of 2 or more. For example, two terminal portions may be disposed on the same side (arc) of first electrode 213 illustrated in FIG. 9.

The shape of first electrode 113 and second electrode 114 in a plan view is not limited to a quadrilateral or round shape, and may be a shape that includes a curve such as an oval, or a polygon, for instance.

Figure 13:
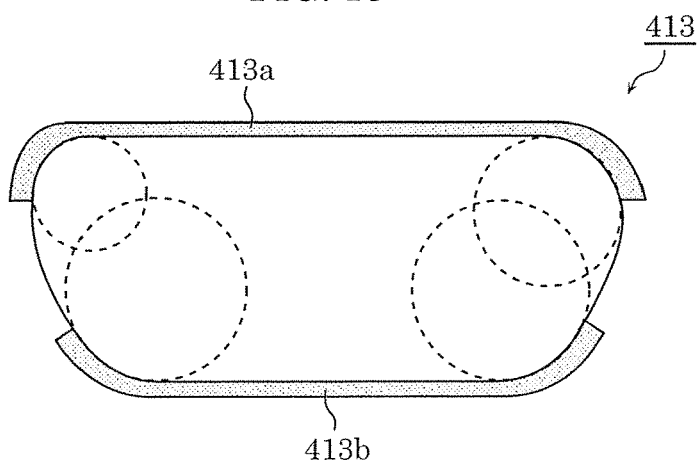
FIG. 13 is a plan view of a different first electrode in Variation 2 of the embodiment.

FIG. 13 is a plan view of first electrode 413 having a different shape in a plan view in this variation. For example, it is possible to conceive the case where the shape has corners having a constant curvature so as to be tapered (bent) into a trapezoid, as first electrode 413 illustrated in FIG. 13. In this case, terminal portions 413a and 413b are located up to portions where the circles of curvature and the contours substantially match, as indicated by the dashed lines in FIG. 13. It is better to provide a space between terminal portions 413a and 413b, rather than providing a terminal portion therebetween.

[4. Example of Connection to Terminal Portion]

The following describes an example of a method of connecting lead wires for connecting driver 120 with first electrode 113 and second electrode 114.

Figure 14:
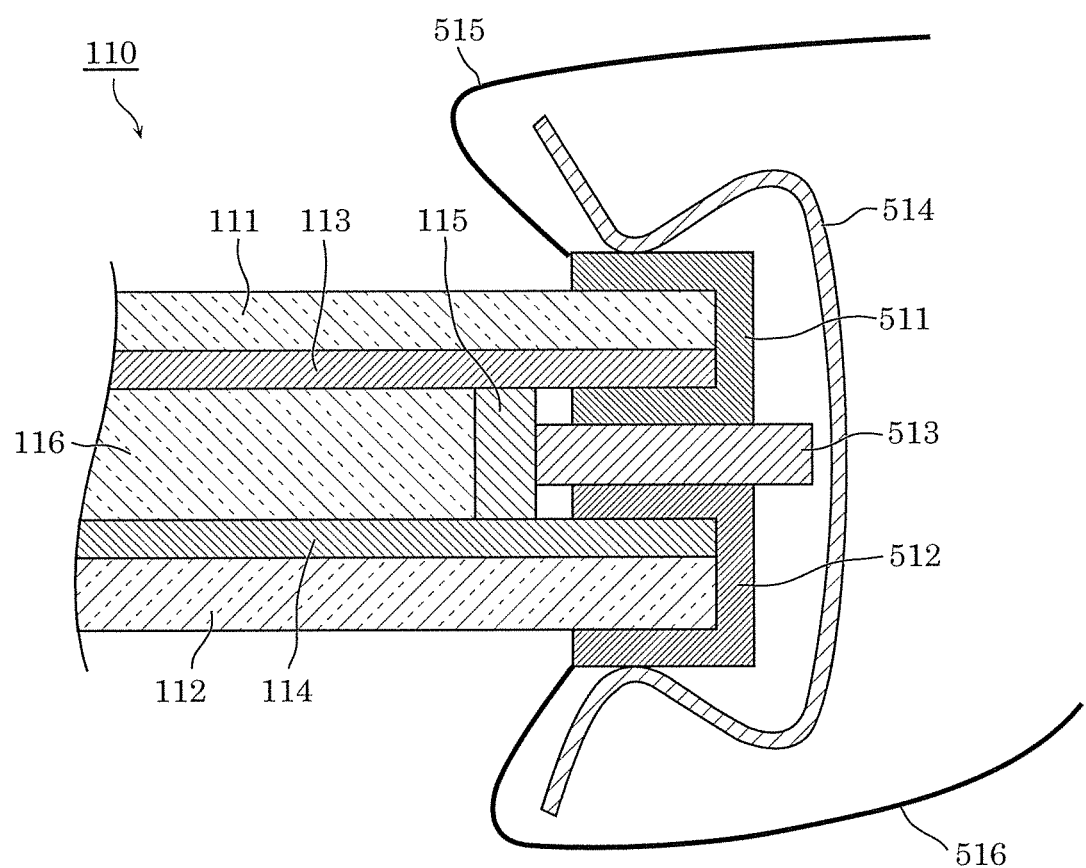
FIG. 14 is an enlarged cross-sectional view of an edge portion of the electrochromic element of the electrochromic device according to the embodiment.

FIG. 14 is an enlarged cross-sectional view of an edge portion of EC element 110 of EC device 100 according to the present embodiment. FIG. 14 illustrates an example in which lead wires are used to connect terminal portions and driver 120 (or switch 141 or 142).

In the present embodiment, first electrode 113 and second electrode 114 face each other with a narrow gap of about at most 1 mm therebetween. Accordingly, it is difficult to connect the lead wires to the terminal portions of both upper and lower electrodes, which are located at the same positions.

In view of this, in the present embodiment, EC element 110 includes conductive films 511 and 512, insulator 513, clip 514, and lead wires 515 and 516. Note that although FIG. 14 illustrates only the right edge portion of EC element 110, the left edge portion also has the same configuration.

As illustrated in FIG. 14, conductive films 511 and 512 are connected to the edge portions of first electrode 113 and second electrode 114, respectively, and folded back onto the surfaces of first substrate 111 and second substrate 112 which do not face each other. Here, film 511 is connected to terminal portion 113b of first electrode 113. Film 512 is connected to terminal portion 114b of second electrode 114. Films 511 and 512 are metal foils such as aluminum foils and copper foils, for example. Note that bendable thin conductive plates may be used instead of conductive films 511 and 512.

Insulator 513 is interposed between films 511 and 512. This prevents films 511 and 512 from contacting each other and electrically short-circuiting. For example, insulator 513 is formed using an elastic resin material such as urethane or silicone rubber. Insulator 513 and films 511 and 512 can be interposed between first electrode 113 and second electrode 114 collectively (simultaneously) in a state where insulator 513 is between films 511 and 512.

Clip 514 is an example of a fastener at least a contact surface of which is not conductive. Clip 514 holds EC element 110 by sandwiching the edge portion of EC element 110, thus achieving favorable conduction between lead wires 515 and 516 and terminal portions 113b and 114b.

Lead wires 515 and 516 are conductive lines for supplying a potential from driver 120. Although not illustrated, lead wires 515 and 516 are connected to driver 120 via switches 141 and 142, respectively.

As illustrated in FIG. 14, lead wires 515 and 516 are connected to films 511 and 512, respectively. Specifically, lead wire 515 is connected to a portion of film 511 on the first substrate 111 side (folded portion), and lead wire 516 is connected to a portion of film 512 on the second substrate 112 side (folded portion). Note that lead wires 515 and 516 can be connected to films 511 and 512 using, for example, a conductive adhesive such as solder.

In EC element 110 illustrated in FIG. 14, lead wires 515 and 516 are connected to films 511 and 512, respectively, on the outer sides of the substrate, rather than in a narrow space between the electrodes. Thus, lead wires 515 and 516 are connected to the films in a large space on the outer sides of the substrate, and thus the reliability of connection can be increased, and a short circuit between the electrodes can also be inhibited.

[5. Example of Use]

The following describes a specific example of use of EC device 100 having the configuration as described above. When in the light-shielding state, EC element 110 according to the present embodiment is allowed to have a transmittance of 0.1% or less, and can secure a reflectance of 80% if deposited metal 117 is light-reflective metal. Accordingly, for example, the present disclosure is applicable to various usages, such as smart mirrors, smart windows (such as windows as building material, and garret windows), and sunroofs of vehicles.

Figure 15:
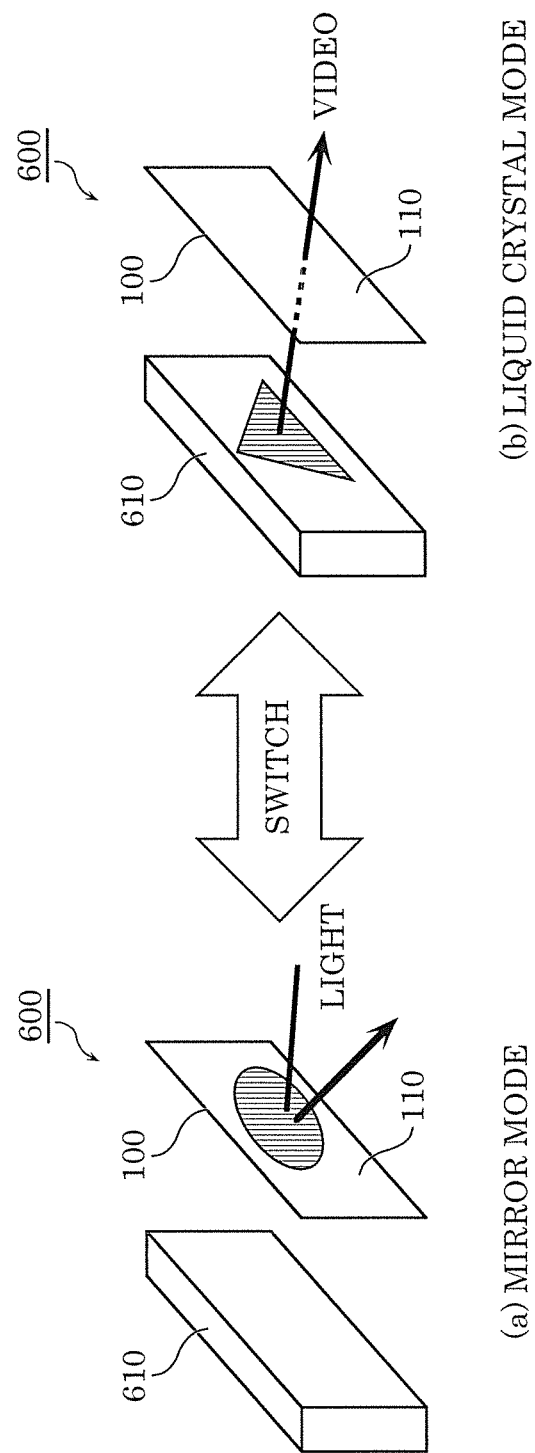
FIG. 15 is a conceptual diagram illustrating a smart mirror in the embodiment.

For example, EC device 100 can be used for smart mirror 600 as illustrated in FIG. 15. FIG. 15 is a conceptual diagram of smart mirror 600 in the present embodiment.

Smart mirror 600 illustrated in FIG. 15 is, for example, a rearview mirror of a vehicle, such as a driving mirror. Smart mirror 600 is a device which displays, on a display disposed at the position of a rearview mirror, a video captured by a camera attached to the rear of the vehicle so as to substitute for the rearview mirror, and also switches between the substituted rearview mirror and a normal mirror.

Smart mirror 600 includes EC device 100 and display device 610 as illustrated in FIG. 15. EC element 110 of EC device 100 is disposed in front of display device 610 (that is, on the display surface side).

For example, EC element 110 of EC device 100 can deposit silver as thin metal film 118, and second electrode 114 is transparent. EC element 110 can switch between the transparent state and the reflective state according to an applied electric field.

Display device 610 is a flat display such as a liquid crystal display (LCD) or an organic electroluminescent (EL) display.

It is assumed that a user looks at smart mirror 600 from the EC device 100 side. Smart mirror 600 can operate in two modes, namely, a mirror mode and a liquid crystal mode.

As illustrated in (a) of FIG. 15, EC element 110 is in the reflective state when in the mirror mode, and thus reflects light on the surface thereof, thus functioning as a mirror. At this time, even if display device 610 is displaying contents such as an image or a video (for example, a video of the back of the vehicle), EC element 110 blocks the image (video). Accordingly, the user cannot see the image or the video displayed on display device 610.

As illustrated in (b) of FIG. 15, EC element 110 is in the transparent state when in the liquid crystal mode, and display device 610 displays contents such as an image or a video. EC element 110 transmits light, and thus the user can see contents displayed by display device 610, as it is.

Note that the modes of smart mirror 600 can be switched according to a user operation or the contents of the image (video).

For example, EC device 100 can be applied to not only smart mirrors, but also to smart glasses. Smart glasses display a video on a glass portion of the glasses, using a display device or a very small projector, and are progressively developed in order to give work instructions or guidance. However, the smart glasses are extremely susceptible to the influence of natural light, and thus it is difficult to secure contrast that can be perceived by human vision.

The influence of natural light can be reduced by applying EC device 100 according to the present embodiment to the smart glasses.

Note that when the present disclosure is applied to smart glasses, not the entire lens of glasses, but a portion of the lens may be used as the EC device, and only one lens on either the right or left side may be used as the EC device.

Note that when the present disclosure is used for a smart window or a window such as a sunroof of a vehicle, while thermally insulating effects can be yielded by depositing metal 117 so as to achieve the light-shielding state, the window can also be used as a normal window when in the transparent state.

6. Conclusion

As described above, electrochromic device 100 according to the present embodiment includes: first electrode 113 which transmits light; second electrode 114 disposed opposite first electrode 113; electrolyte 116 located between first electrode 113 and second electrode 114, and containing metal 117 depositable on one of first electrode 113 and second electrode 114, according to a potential difference between first electrode 113 and second electrode 114; driver 120 which applies a predetermined potential to a target electrode which is at least one of first electrode 113 and second electrode 114; and controller 130 which changes a potential application portion of the target electrode to which the predetermined potential is applied, in a potential application period during which the predetermined potential is applied.

Accordingly, in a potential application period during which a predetermined potential is applied, the potential application portion of a target electrode to which a potential is applied is changed, and thus the target electrode can be prevented from having an irregular potential. For example, an electric field applied to electrolyte 116 is time-averaged, and thus metal 117 can be deposited more uniformly on the surface. Specifically, thin metal film 118 having a less varying thickness on the surface can be formed.

For example, first electrode 113 which is an example of the target electrode includes terminal portions 113a and 113b along a periphery in a plan view, terminal portions 113a and 113b being portions to which the predetermined potential is applicable, and controller 130 changes the potential application portion from, among terminal portions 113a and 113b, a first terminal portion (for example, terminal portion 113a) to which the predetermined potential is being applied to a second terminal portion (for example, terminal portion 113b) different from the first terminal portion.

Accordingly, the terminal portions are located along the periphery of first electrode 113, and thus a lead wire, for instance, can be readily connected.

For example, the second terminal portion (for example, terminal portion 113b) is most distant from the first terminal portion (for example, terminal portion 113a).

Accordingly, when a potential is applied to the first terminal portion, a potential at the second terminal portion most distant from the first terminal portion is likely to be the lowest due to a voltage drop at the target electrode. Accordingly, by changing the potential application portion from the first terminal portion to the second terminal portion, a high potential can be supplied to the second terminal portion with a low potential. Accordingly, the electric field applied to electrolyte 116 is time-averaged, and thus metal 117 can be deposited more uniformly on the surface.

For example, first electrode 113 which is an example of the target electrode has a quadrilateral shape in a plan view, terminal portions 113a and 113b are located along sides of the quadrilateral, and the second terminal portion (for example, terminal portion 113b) is located along the side located opposite the first terminal portion (for example, terminal portion 113a). For example, as illustrated in FIG. 12, first electrode 313 which is an example of the target electrode has one of a round shape and an oval shape in the plan view, terminal portions 313a to 313f are located along arcs of the round shape or the oval shape, and the second terminal portion (for example, terminal portion 313b) is located along one of the sides or the arcs located opposite the first terminal portion.

Accordingly, even if the shape of the target electrode in a plan view is quadrilateral or round, by changing a potential application portion from one of the terminal portions which are located along the periphery to another, an electric field applied to electrolyte 116 is time-averaged, and thus metal 117 can be deposited more uniformly on the surface.

For example, EC device 100 further includes: switch 141 which selectively connects driver 120 and one of terminal portions 113a and 113b. In EC device 100, controller 130 changes the potential application portion by controlling switch 141.

Accordingly, a potential application portion can be readily changed by controlling the switch. Accordingly, equalization of the thickness of thin metal film 118 deposited can be readily controlled.

For example, controller 130 further changes the potential application portion from the second terminal portion (for example, terminal portion 113b) to the first terminal portion (for example, terminal portion 113a) in the potential application period.

Accordingly, a potential application portion can be changed not only once but also plural times, and thus selection of potential application portions is more balanced. Thus, metal 117 can be deposited more uniformly on the surface.

For example, controller 130 repeatedly changes the potential application portion in the potential application period.

Accordingly, since a potential application portion is repeatedly changed, selection of potential application portions is more balanced. Thus, metal 117 can be deposited more uniformly on the surface.

For example, each of first electrode 113 and second electrode 114 is the target electrode.

Accordingly, a potential is applied to both first electrode 113 and second electrode 114, and thus a potential difference between the electrodes is readily controlled. Thus, equalization of the thickness of thin metal film 118 deposited can be readily controlled.

Now, assume that the potential application portions of first electrode 113 and second electrode 114 are close to each other. For example, in FIG. 3, when a potential is applied to terminal portions 113a and 114a, a strong electric field is applied to a left portion of electrolyte 116. Nevertheless, an electric field applied to a right portion of electrolyte 116 is weak. Accordingly, metal 117 is not readily deposited in the right portion of electrolyte 116, and the thickness of thin metal film 118 becomes uneven.

In view of this, in the present embodiment, for example, controller 130 changes the potential application portion of first electrode 113 to a terminal portion of first electrode 113, and changes the potential application portion of second electrode 114 to a terminal portion of second electrode 114, the terminal portion of first electrode 113 and the terminal portion of second electrode 114 being most distant from each other among the terminal portions in a plan view.

Accordingly, the potential application portions of first electrode 113 and second electrode 114 can be kept away from each other. Accordingly, for example, electrolyte 116 is mostly present between the potential application portion of first electrode 113 and the potential application portion of second electrode 114, and thus a potential can be effectively applied to electrolyte 116.

For example, metal 117 is a noble metal. At this time, for example, the noble metal is one of silver, gold, platinum, and palladium.

Accordingly, since noble metals have a low ionization tendency, and thus if an electric field is applied to electrolyte 116, metal 117 can be stably deposited as thin metal film 118.

Other Embodiments

The above embodiments have been described as examples of the technology disclosed in the present application. However, the technology according to the present disclosure is not limited to this, and can be applied also to an embodiment on which modification, replacement, addition, and omission, for instance, have been performed. Furthermore, elements described in the above embodiments can be combined to achieve a new embodiment.

Thus, other embodiments are exemplified in the following.

For example, the above embodiments have described an example in which a potential application portion is changed when metal 117 is to be deposited, yet a potential application portion may be changed when thin metal film 118 is to be dissolved. Alternatively, a potential application portion may be changed both when metal 117 is to be deposited and dissolved.

For example, a potential application portion of only one of first electrode 113 and second electrode 114 may be changed. The target electrode to which a potential is applied by driver 120 may be one of first electrode 113 and second electrode 114. The target electrode may be at least one of first electrode 113 and second electrode 114.

For example, when one of first electrode 113 and second electrode 114 is grounded, all the terminal portions may be connected to driver 120 simultaneously, without changing a potential application portion.

The above has described the embodiments as examples of the technology according to the present disclosure. For the description, the accompanying drawings and the detailed description are provided.

Thus, the elements illustrated in the accompanying drawings and described in the detailed description may include not only elements necessary for addressing the problem, but also elements not necessarily required for addressing the problem, in order to illustrate the above technology. Accordingly, a mere fact that such unnecessarily required elements are illustrated in the accompanying drawings and described in the detailed description should not immediately lead to a determination that such unnecessarily required elements are required.

In addition, the embodiments described above are intended to illustrate the technology according to the present disclosure, and thus various modifications, replacement, addition, and omission, for instance, can be performed within the scope of claims and equivalent thereof.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure allows metal to be deposited more uniformly on a surface, and thus is applicable to devices having optical states that can be changed, such as smart mirrors, smart glasses, and smart windows.

What is claimed is:

1. An electrochromic device, comprising:
a first electrode which transmits light;
a second electrode disposed opposite the first electrode;
an electrolyte located between the first electrode and the second electrode, and containing metal depositable on one of the first electrode and the second electrode, according to a potential difference between the first electrode and the second electrode;
a power supply which applies a predetermined potential to a deposited electrode so that the deposited electrode is a cathode, the deposited electrode being one of the first electrode and the second electrode; and
a microcomputer which is configured to switch a connected state of the deposited electrode and the power supply, in a potential application period during which the predetermined potential is applied, wherein
the deposited electrode includes a first terminal portion and a second terminal portion,
the connected state includes a first state in which the first terminal portion in the deposited electrode is connected to the power supply, and a second state in which the second terminal portion in the deposited electrode is connected to the power supply,
in the first state, the metal in the electrolyte is deposited on the deposited electrode, more on a portion closer to the first terminal portion than to the second terminal portion,
in the second state, the metal in the electrolyte is deposited on the deposited electrode, more on a portion closer to the second terminal portion than to the first terminal portion, and
the microcomputer repeatedly switches between the first state and the second state, to make an uneven deposited state even.

2. The electrochromic device according to claim 1, wherein
the deposited electrode has one of a quadrilateral shape and a round shape in the plan view,
the first terminal portion and the second terminal portion are located along sides of the quadrilateral shape or arcs of the round shape, and
the second terminal portion is located along one of the sides or the arcs located opposite the first terminal portion.

3. The electrochromic device according to claim 1, wherein
the microcomputer is configured to periodically change the potential application location in the potential application period.

4. The electrochromic device according to claim 1, wherein
an other electrode which is not the deposited electrode, out of the first electrode and the second electrode, includes a third terminal portion which faces the first terminal portion of the deposited electrode, and a fourth terminal portion which faces the second terminal portion of the deposited electrode,
the first state is a state in which the first terminal portion and the fourth terminal portion are connected to the power supply, and
the second state is a state in which the second terminal portion and the third terminal portion are connected to the power supply.

5. The electrochromic device according to claim 4, wherein
the deposited electrode and the other electrode each include a plurality of terminal portions, and
the fourth terminal portion is in a location most distant from the first terminal portion, out of the plurality of terminal portions included in the other electrode.

6. The electrochromic device according to claim 1, wherein
the metal is a noble metal.

7. The electrochromic device according to claim 6, wherein
the noble metal is one of silver, gold, platinum, and palladium.

* * * * *